United States Patent [19]

Hartmann et al.

[11] Patent Number: 5,407,650
[45] Date of Patent: Apr. 18, 1995

[54] PROCESS FOR PURIFYING A TECHNICAL IRON CHLORIDE SOLUTION BY SELECTIVE PRECIPITATION

[75] Inventors: Achim Hartmann, Pulheim; Ulrich Rothe, Cologne; Dieter Schinkitz, Leverkusen, all of Germany

[73] Assignee: Kronos, Inc., Hightstown, N.J.

[21] Appl. No.: 170,917

[22] Filed: Dec. 21, 1993

[30] Foreign Application Priority Data

Dec. 22, 1992 [DE] Germany .................. 42 43 559.5

[51] Int. Cl.$^6$ .................. C22B 47/00; C22B 34/00; C22B 21/00; C22B 26/00
[52] U.S. Cl. .................. 423/50; 423/127; 423/164; 423/85; 423/55; 423/66; 210/724; 210/912; 210/726
[58] Field of Search .................. 423/DIG. 1, 127, 50, 423/164, 85, 55, 66; 210/724, 912, 726

[56] References Cited

U.S. PATENT DOCUMENTS

| | | | |
|---|---|---|---|
| 3,617,562 | 11/1971 | Cywin | 423/DIG. 1 |
| 3,647,414 | 3/1972 | Nilsen | 75/1 |
| 3,655,344 | 4/1972 | Mitchell et al. | 23/299 |
| 3,754,072 | 8/1973 | Sato et al. | 423/66 |
| 3,867,515 | 2/1975 | Bohl et al. | 423/593 |
| 4,540,551 | 9/1985 | Bonsack et al. | 423/77 |
| 4,579,721 | 4/1986 | Friedman | 423/66 |
| 4,764,284 | 8/1988 | Jansen | 210/724 |
| 4,765,908 | 8/1988 | Monick et al. | 210/666 |
| 5,248,497 | 9/1993 | Hartmann et al. | 423/141 |

FOREIGN PATENT DOCUMENTS

| | | | |
|---|---|---|---|
| 45-03526 | 2/1970 | Japan | 423/DIG. 1 |
| 46-07365 | 2/1971 | Japan | 423/633 |
| 49-26199 | 3/1974 | Japan | 423/DIG. 1 |
| 63-112428 | 5/1988 | Japan | 423/DIG. 1 |
| 1-030694 | 2/1989 | Japan | 210/724 |
| 1-293187 | 11/1989 | Japan | 210/912 |

*Primary Examiner*—Steven Bos
*Attorney, Agent, or Firm*—Michael J. Cronin

[57] ABSTRACT

A process for purifying an acidic technical-grade iron chloride solution formed from cyclone dust from the production of $TiO_2$ in accordance with the chloride process by adjusting the pH with a first neutralizing agent and thereafter introducing the pH adjusted solution in a controlled manner into a solution containing a second neutralizing agent. In this process undesired ions which are to be separated, such as chromium, vanadium, zirconium and/or niobium, precipitate in the form of efficiently filterable hydroxides which can be separated industrially under economical conditions by filtration. The filter cake is non-hazardous and can safely be disposed of by dumping. Calcium carbonate is the preferred neutralizing agent, and the pH adjustment may also advantageously be effected by using scrap iron or by using iron sinters with reduction of any Fe(III) ions before the second neutralization step.

14 Claims, No Drawings

PROCESS FOR PURIFYING A TECHNICAL IRON CHLORIDE SOLUTION BY SELECTIVE PRECIPITATION

BACKGROUND OF THE INVENTION

This invention is directed to a process for separating contaminating metal ions from an acid solution containing predominantly iron(II) chloride obtained from dissolution of cyclone dust from the preparation of titanium dioxide by the chloride process in dilute hydrochloric acid, the separation being effected by increasing the pH and separating the metal hydroxide precipitate which forms.

Iron(II) chloride solutions are used as precipitating and flocculating agents in purifying waste water (See, Wassertechnische Information der KRONOS TITAN-GMBH, Ferrofloc TM). Large quantities of iron(II) chloride are generated in the preparation of titanium dioxide according to the so-called chloride process. In this process, a titanium- and iron-containing raw material, for example titanium slag or ilmenite, is chlorinated in the presence of coke as a reducing agent in a fluid bed reactor at temperatures of about 1000° C. In addition to titanium tetrachloride, iron(II) chloride is also formed in the process. The iron(II) chloride, together with the water-insoluble solids [principally coke, undecomposed titanium dioxide and silicon dioxide] as well as other metal chlorides, is separated from the gas leaving the reactor in a cyclone connected to the reactor outlet. The separated mixture is referred to as cyclone dust. Known processes for working up such cyclone dust, for example that described in U.S. Pat. No. 3,867,515, are expensive.

By forming the cyclone dust into a suspension in dilute hydrochloric acid and separating the water-insoluble components, a solution is obtained which contains predominantly iron (II) chloride, but which additionally contains aluminum chloride, manganese chloride, magnesium chloride, zirconium chloride and trace elements such as chromium, niobium and vanadium as chlorides. If such an iron(II) chloride solution is used for waste water treatment and sludge conditioning, steps must be taken, due to the unavoidable content of trace elements in the composition of the raw material, to prevent the waste water from becoming contaminated with excessive levels of undesired chemicals which in turn cause problems in disposing of the waste water. The "contaminated" iron(II) chloride solution must therefore be further purified before its use; i.e. chromium, niobium and vanadium ions must be removed from the solution.

Various techniques are known in the art for recovering metal ions. Mitchell et al, U.S. Pat. No. 3,655,344 discloses treating titanium tetrachloride drier residue by leaching with water and then adding an alkaline reagent to the resulting solution to raise the pH to from 4 to 12 and insolubilize vanadium and chromium values. Sato et al., U.S. Pat. No. 3,754,072 describes the recovery of vanadium values from titanium tetrachloride distillation residue by steam treatment, addition of alkali, filtering out insolubles, adjusting the pH to 0.5 to 2.5, and filtering out the resulting precipitate. Friedman, U.S. Pat. No. 4,579,721 discloses recovery of metals such as nickel or vanadium from scrubber waste by leaching with acid solution to dissolve the metals, raising the pH to selectively precipitate a first metal, filtering out the precipitate, thereafter raising the pH again to selectively precipitate another metal which precipitates out at a higher pH than the first metal, and so on. Hartmann et al., U.S. Pat. No. 5,248,497 describes recovery of purified ferrous chloride by two-step cooling of a filtered solution to crystallize substantially pure ferrous chloride. None of these prior documents teaches how to separate undesired metal ions from a contaminated solution of iron(II) chloride obtained by treating cyclone dust from the production of titanium dioxide by the chloride process with hydrochloric acid.

If the pH of a contaminated iron(II) chloride solution obtained by treating cyclone dust with hydrochloric acid is raised above 1, the dissolved metal ions precipitate as hydroxides according to their solubility products. Iron(II) ions will remain in solution up to a pH of above 6. Thus a contaminated ("technical") iron chloride solution theoretically could be transformed via selective precipitation into a neat iron chloride solution. In practice, however, it is not possible to carry out such a procedure. If one adds a neutralizing agent such as, for example, sodium hydroxide, calcium hydroxide, magnesium hydroxide, sodium carbonate or calcium carbonate, to an acid solution of cyclone dust, then metal hydroxide sols are formed which, due to their colloidal structure, are extremely difficult to filter out and are not suitable for disposal by dumping.

Russian patent No. SU 676,559 describes the precipitation of metal hydroxides from a solution which contains undesired heavy metal ions in addition to iron. The precipitation is effected by addition of an 8% sodium hydrogen carbonate solution at 20° C. By increasing the pH to 4.5, the chromium, in particular, should be concentrated in the filter cake. Under the indicated precipitation conditions, the colloidal hydroxides cannot be filtered out at reasonable cost. The patent does not contain any information about the nature of the filter cake or its disposal.

Attempts to separate undesired metal ions, such as chromium, niobium, zirconium and/or vanadium, from an iron(II) chloride solution by precipitating the undesired metal ions as hydroxides usually produce very highly dispersed colloidal suspensions. It is extremely difficult, if not impossible, to separate such precipitated metal hydroxides by filtration sufficiently quickly and completely for practical application. Moreover, the filtration residue that is obtained is in a form which is not suitable for disposal in a landfill.

U.S. Pat. No. 4,765,908 describes a different type of separation of chromium from metal chloride solutions in which bentonire, especially montmorillonite, at least one flocculent and alkali or alkaline earth metal carbonates are used together with zirconium catalysts and at least one polyelectrolyte, via which the heavy metal ions are adsorptively bound and the separation of the filter cake offers no difficulties. The filtration residue is also disposable. However, this process is very expensive because of the use of chemicals, and it also produces an exceptionally large volume of sludge.

In published German patent application No. DE 41 30 808 A1 a process is proposed for separating the undesired ions from an iron(II) chloride solution prepared from cyclone dust through selective crystallization. Although this process may lead to the desired purification of the iron(II) chloride solution, the capital costs and operating costs of this process are quite considerable.

Despite the expenditure of considerable effort in the prior art, there remains a need for an effective and economical process for removing undesired metal ions from a technical iron(II) chloride solution. Moreover, because large amounts of contaminated iron(II) chloride solution are generated in the production of titanium dioxide by the chloride process, a process is needed which can efficiently and effectively handle large volumes of solution, e.g. on the order of 15 $m^3$ per hour.

SUMMARY OF THE INVENTION

It is the object of the invention to provide a new process for separating undesired metal ions from an iron(II) chloride solution contaminated therewith.

Another object of the invention is to provide a process for separating undesired ions from an iron(II) chloride solution which is especially suitable for removing ions such as chromium, niobium, zirconium and/or vanadium.

A further object of the invention is to provide a process for separating undesired metal ions from an iron(II) chloride solution which can be readily applied to the treatment of large volumes of contaminated solution.

It is also an object of the invention to provide a process for separating undesired metal ions from an iron(II) chloride solution which does not involve high capital or operating costs.

An additional object of the invention is to provide a process for separating undesired metal ions from an iron(II) chloride solution in which the removed ions are recovered in a form suitable for disposal by dumping in a landfill.

These and other objects of the invention are achieved by providing a process for separating undesired metal ions from an acidic iron(II) chloride solution, which comprises the steps of adjusting the iron(II) chloride solution to a pH value of from 0.3 to 0.8 with a first neutralizing agent; thereafter adding the pH-adjusted iron(II) chloride solution in a controlled manner to a solution containing a stoichiometric excess of poorly soluble second neutralizing agent relative to the metal ions to be separated from the iron(II) chloride solution, the adding step being controlled such that the resulting admixture is maintained at a pH of at least 2 but below the pH at which iron hydroxide precipitates, whereby a precipitate of hydroxides of said undesired metal ions forms, and separating the precipitate of hydroxides of said undesired metal ions from the iron(II) chloride solution.

DETAILED DESCRIPTION OF PREFERRED EMBODIMENTS

In accordance with the present invention it has now been found that through a special two-stage process of partial neutralization, metal hydroxides of the ions to be separated are formed which can be separated more easily than thought in the past on a large technical scale, thereby making it possible for the first time to purify large quantities of contaminated iron(II) chloride solutions in an economical manner through selective precipitation. The process is characterized by the fact that the solution to be purified is initially adjusted with a first neutralizing agent to a pH between 0.3 and 0.8 and then the resulting partially neutralized solution is introduced into a vessel containing a suspension of a poorly soluble second neutralizing agent in water or purified iron (II) chloride solution. The suspension contains a stoichiometric excess of the second neutralizing agent relative to the metal ions which contaminate the waste water and are to be removed by precipitation. In a preferred embodiment, the addition of the partially neutralized solution is controlled such that the pH of the resulting admixture is maintained in the range from about 2 to about 4. The addition of the partially neutralized solution is controlled so that the pH in the vessel never falls below 2. In a preferred embodiment, the suspension containing the second neutralizing agent contains from 1.05 to 1.4 times the amount of said second neutralizing agent required to participate the undesired metal ions which are to be separated from the iron(II) chloride solution.

The precipitates obtained according to the process of the invention are readily filterable, and the filter cake is suitable for landfill disposal.

As used herein, the term "poorly soluble" neutralizing agent refers to a neutralizing agent which is substantially insoluble in water at ambient temperatures, though it may exhibit some limited solubility. Typical poorly soluble neutralizing agents exhibit solubilities of less than about 0.1% by weight at room temperature.

Calcium carbonate has proved to be especially advantageous as the second neutralizing agent. It is available in unlimited amounts, and because of its low solubility in water or an iron chloride solution, it appears to lead, i.e. through a type of natural buffering action of the suspension in the reaction vessel, to a less spontaneous formation of nuclei and thus to an avoidance of a gel state. The solids formed with this neutralizing agent are substantially more readily filterable. This processing method appears to result in decreased formation of nuclei. Iron(II) hydroxide cannot form because the pH in the vessel is too low. Iron(III) hydroxide likewise fails to form because of the inherent generation of carbon dioxide which occurs in the system and forms a protective gas atmosphere, thereby preventing iron(II) from being oxidized to iron(III) by atmospheric oxygen.

Calcium carbonate, which in a suspension shows the desired buffering action, is especially preferred as the second neutralizing agent. Suitable agents for use as the first neutralizing agent for the partial neutralization of the technical iron chloride solution include, in addition to alkaline earth metal carbonates (advantageously calcium carbonate or pulverized dolomite, i.e. magnesium limestone), preferably iron or iron compounds. The addition of iron increases the quantity of desired end product, without causing the formation of by-products. If scrap iron is added as the first neutralizing agent, no special measures need to be observed. However, if sinters, (a mixed oxide of divalent and trivalent iron) are used, iron (III) ions arise, which would precipitate in part as iron (III) hydroxide when the solution is introduced into the suspension of the second neutralizing agent, and which thus would be lost with the filtration residue. Accordingly, if sinters are used as the first neutralizing agent, iron(III) ions must be converted by reaction with scrap or some other reducing agent into iron(II) ions before the partially neutralized solution is introduced into the vessel containing the suspension of the second neutralizing agent.

If calcium carbonate is also used as the first neutralizing agent, then the iron (II) chloride solution will contain relatively high quantities of calcium chloride. Since that is frequently undesirable, calcium sulfate can be precipitated from such a solution by adding iron sulfate and separated from the solution by filtering, in which case the concentration of iron(II) chloride is correspondingly increased.

Preferably the temperature of the suspension in the vessel should be from 60° C. to 90° C. Under these conditions precipitates are formed, which can be separated especially advantageously and safely disposed of in a landfill.

It has proved advantageous to extend the time of the second partial neutralization step. The controlled introduction of the solution partially neutralized with the first neutralizing agent into the reaction vessel preferably takes place in such a way that from 25 to 33 liters of partially neutralized solution per hour are added per kilogram of calcium carbonate suspended in the reaction vessel.

The invention is described in further detail hereinafter in the following non-limiting examples.

A typical contaminated iron(II) chloride solution obtained by dissolving cyclone dust in dilute hydrochloric acid was found to have the following composition:

| Fe  | 8.8%  | Ti | 410 ppm  |
|-----|-------|----|----------|
| Mn  | 1.61% | Cr | 1170 ppm |
| Mg  | 0.67% | V  | 2410 ppm |
| Ca  | 0.10% | Nb | 580 ppm  |
| HCl | 2.6%  | Zr | 1140 ppm |

The following four experiments were carried out with this technical iron(II) chloride solution.

EXAMPLE 1

Partial Neutralization and Precipitation with Calcium Carbonate (Powdered Limestone).

1200 ml of the contaminated iron(II) chloride solution were heated to 70° C. Over the course of 30 minutes 41.5 g of powdered limestone (ca 97% CaCO$_3$, grain size less than 0.1 mm) were stirred in as a first neutralizing agent, after which the pH was 0.78. 30 ml/min of this solution partially neutralized with the first neutralizing agent were introduced into a powdered limestone suspension (72 g of powdered limestone in 72 g water) at 70° C. The pH in the suspension after the addition was 2.8. The mixture was stirred for another 30 minutes, whereupon the pH increased to 3.4. The suspension was then filtered at 70° C. In all examples the filtration was carried out using a vacuum filter having a diameter of 13 cm at a pressure of 50 mbar. The course of the filtration is indicated in Table 1.

TABLE 1

| Filtered Amount (ml) | 50 | 100 | 150 | 200 | 300 | 400 | 500 | 600 |
|---|---|---|---|---|---|---|---|---|
| Filtration Time (sec) | 11 | 28 | 47 | 67 | 105 | 152 | 220 | 290 |

The filter cake was 10 mm thick and sufficiently solid that it could be cut with a knife. The clear filtrate had the following composition:

| Fe | 9.1%   | Ti | 9 ppm |
| Mn | 1.74%  | Cr | 8 ppm |
| Mg | 0.76%  | V  | 3 ppm |
| Ca | 3.2%   | Nb | 7 ppm |
| Al | 25 ppm | Zr | 5 ppm |

The ratio of chromium to iron was improved from 0.0133 to 0.000088; the ratio of vanadium to iron from 0.0274 to 0.000033. Due to the good filterability of the precipitate, approximately 97% of the contaminating ions were removed in a relatively short time, and a solid filter cake was obtained from the precipitated material.

EXAMPLE 2

Neutralization of the Contaminated Iron Chloride Solution with Mill Sinters and Reduction of the Fe$^{3+}$.

1200 g of the aforedescribed contaminated technical iron(II) chloride solution were stirred with 25.5 g of mill sinters (FeO=68%; Fe$_2$O$_3$=32%) for one hour at 80° C. In order to reduce the Fe$^+$ ions, powdered iron was added and the mixture was stirred for a further 20 minutes at 80° C. The pH of the resulting mixture was 0.75. This partially neutralized solution was introduced at a rate of 30 ml per minute into a vessel containing a suspension of 72 g powdered limestone in 72 g water at a temperature of 70° C. At the conclusion of the introduction of the solution after 30 minutes, a pH of 2.8 was attained. After 30 minutes of additional stirring, the pH increased to 3.3. The filtration was carried out at 70° C. using a vacuum filter under the same conditions as in Example 1. The course of the filtration is indicated in Table 2.

TABLE 2

| Filtered Amount (ml) | 50 | 100 | 150 | 200 | 300 | 400 | 500 | 600 |
|---|---|---|---|---|---|---|---|---|
| Filtration Time (sec) | 14 | 31 | 57 | 87 | 165 | 276 | 415 | 540 |

The composition of the filtrate solution was:

| Fe | 10.30% | Ti | 5 ppm |
| Mn | 1.57%  | Cr | 6 ppm |
| Mg | 0.74%  | V  | 4 ppm |
| Ca | 1.40%  | Nb | 4 ppm |
| Al | 26 ppm | Zr | 2 ppm |

The chromium to iron ratio was improved from 0.0133 to 0.00058; the vanadium to iron ratio from 0.0274 to 0.00039.

EXAMPLE 3

Influence of the Rate of Addition

The procedure of Example 2 was followed except that the rate of addition of the contaminated solution into the calcium carbonate suspension in the vessel was increased to 50 ml per minute. At the end of the addition the pH was 2.2, and after 30 minutes of further stirring the pH was 3.2. As can be seen in Table 3, the filterability was not adversely affected, but the removal of chromium decreased to a ratio of 0.0018, and the removal of vanadium also decreased to a ratio of 0.0027.

TABLE 3

| Filtered Amount (ml) | 50 | 100 | 150 | 200 | 300 | 400 | 500 | 600 |
|---|---|---|---|---|---|---|---|---|
| Filtration Time (sec) | 12 | 27 | 52 | 83 | 160 | 268 | 401 | 521 |

The filtrate had the following composition:

| Fe | 10.28% | Ti | 13 ppm  |
| Mn | 1.5%   | Cr | 19 ppm  |
| Mg | 0.74%  | V  | 277 ppm |
| Ca | 1.37%  | Nb | 46 ppm  |

| -continued | | | |
|---|---|---|---|
| Al | 32 ppm | Zr | 9 ppm |

EXAMPLE 4

Conventional Neutralization (Comparison Example)

1200 g of the contaminated acidic FeCl$_2$ solution were heated to 80° C. and neutralized with mill sinters and trivalent iron ions were reduced with iron as described in Example 2. This solution (pH=0.78; 70° C.) was then partially neutralized by addition of 72 g of solid limestone powder over the course of 30 minutes. At the end of the addition the pH had increased to 2.7 and after 30 minutes of additional stirring time a pH value of 3.0 was attained. The suspension was filtered as described above at a temperature of 70° C. Table 4 shows the very significantly inferior filterability of the resulting solution.

TABLE 4

| Filtered Amount (ml) | 20 | 40 | 60 | 80 | 100 | 150 | 200 |
|---|---|---|---|---|---|---|---|
| Filtration Time (sec) | 8 | 22 | 62 | 180 | 240 | 650 | 1520 |

Thus it can be seen that the filtration rapidly came to a standstill. The approximately 3 mm thick filter cake consisted of a gel-like, semifluid mass. The filtrate had the following composition:

| Fe | 10.41% | Ti | 15 ppm |
|---|---|---|---|
| Mn | 1.51% | Cr | 39 ppm |
| Mg | 0.77% | V | 64 ppm |
| Ca | 1.38% | Nb | 51 ppm |
| Al | 195 ppm | Zr | 12 ppm |

The removal of contaminating ions is also correspondingly small (to a Cr/Fe ratio of 0.00037 and a V/Fe ratio of 0.00061).

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for separating undesired metal ions from an acidic iron(II) chloride solution, said undesired metal ions being selected from the group consisting of Al, Mn, Mg, Ti, Zr, Cr, Nb and V, said process comprising the steps of:

adjusting said iron(II) chloride solution to a pH value of from 0.3 to 0.8 with a first neutralizing agent to form a pH adjusted iron(II) chloride solution, thereafter adding the pH-adjusted iron(II) chloride solution to a solution containing an excess, relative to that amount required to precipitate the metal ions to be separated from said iron(II) chloride solution, of a second neutralizing agent, thereby producing admixture, said second neutralizing agent having a solubility in water at room temperature of less than 0.1% by weight, said adding step being controlled such that the admixture is maintained at a pH of at least 2, but below a pH at which iron hydroxide will precipitate, so that a metal hydroxide precipitate of said undesired metal ions forms and iron(II) ions remain in solution, and separating the metal hydroxide precipitate from the iron(II) chloride solution.

2. A process according to claim 1, wherein said iron-(II) chloride solution is obtained by dissolving cyclone dust resulting chloride process from preparation of titanium dioxide in dilute hydrochloric acid.

3. A process according to claim 1, wherein said solution containing the second neutralizing agent comprises a solution or suspension of said second neutralizing agent in water or in purified iron chloride solution.

4. A process according to claim 1, wherein said second neutralizing agent comprises an alkaline earth metal carbonate.

5. A process according to claim 4, wherein said second neutralizing agent comprises pulverized limestone.

6. A process according to claim 4, wherein said second neutralizing agent comprises pulverized dolomite.

7. A process according to claim 1, wherein the solution containing said second neutralizing agent contains from 1.05 to 1.4 times the amount of said second neutralizing agent required to precipitate the undesired metal ions to be separated from the iron(II) chloride solution.

8. A process according to claim 1, wherein said first neutralizing agent comprises an alkaline earth metal carbonate.

9. A process according to claim 1, wherein said first neutralizing agent comprises scrap iron.

10. A process according to claim 1, wherein said first neutralizing agent comprises iron sinters in which any iron(III) ions have been reduced by treatment with a reducing agent.

11. A process according to claim 10, wherein said reducing agent comprises metallic iron.

12. A process according to claim 1, wherein the resulting admixture from said adding step has a temperature in the range from about 60° C. to about 90° C.

13. A process according to claim 1, wherein the adding step is carried out by adding the pH adjusted iron-(II) chloride solution to a suspension of calcium carbonate at a rate of from 25 to 33 liters iron(II) chloride solution per hour per kg of calcium carbonate in said suspension.

14. A process according to claim 1, wherein said adding step is controlled such that the pH of the resulting admixture is maintained in the range from 2 to about 4.

* * * * *